United States Patent [19]

Shinhara

[11] 4,101,936
[45] Jul. 18, 1978

[54] AUTOMATIC TAPE LOADING TYPE REPRODUCING APPARATUS HAVING INTERMITTENT TAPE SHIFTING CAPABILITY

[75] Inventor: Kazue Shinhara, Sagamihara, Japan

[73] Assignee: Victor Company of Japan, Ltd., Yokohama, Japan

[21] Appl. No.: 756,907

[22] Filed: Jan. 4, 1977

[30] Foreign Application Priority Data

Jan. 7, 1976 [JP] Japan ............................ 51-931

[51] Int. Cl.$^2$ ............................ G11B 15/20
[52] U.S. Cl. ............................ 360/10; 360/71
[58] Field of Search ............ 360/10, 85, 71, 77, 360/73, 74

[56] References Cited

U.S. PATENT DOCUMENTS

| | | | |
|---|---|---|---|
| 3,557,320 | 1/1971 | Hopf | 360/10 |
| 3,869,709 | 3/1975 | Yamagishi | 360/10 |
| 3,968,517 | 7/1976 | Chimura | 360/10 |

*Primary Examiner*—Bernard Konick
*Assistant Examiner*—Alan Faber

[57] ABSTRACT

An automatic tape loading type reproducing apparatus uses a guide drum having at least one rotating head. A cassette contains a supply reel and a take-up reel with a tape extending therebetween. The tape is drawn from the cassette and loading along a specific path in wrapping contact with the guide drum, when the tape is advanced in a forward direction and returned to the cassette when the tape is driven in the reverse direction. A driving motor rotates in a forward direction to drive the loading means and in the reverse direction to drive the loading means. A tape driving means causes tape travel during normal reproduction and terminates the tape travel driving during still picture reproduction. A switch is actuated during still picture reproduction to cause the driving motor to rotate in the reverse direction for a specific time and thereafter to cause the driving motor to rotate in the forward direction for at least the same specific time. As a result of the actuation of the switch, at the time of still picture reproduction the tape driving means is precluded from operation and the tape is taken up on the take-up reel. The tape is paid out from the supply reel intermittently in response to the forward operation during loading.

6 Claims, 6 Drawing Figures

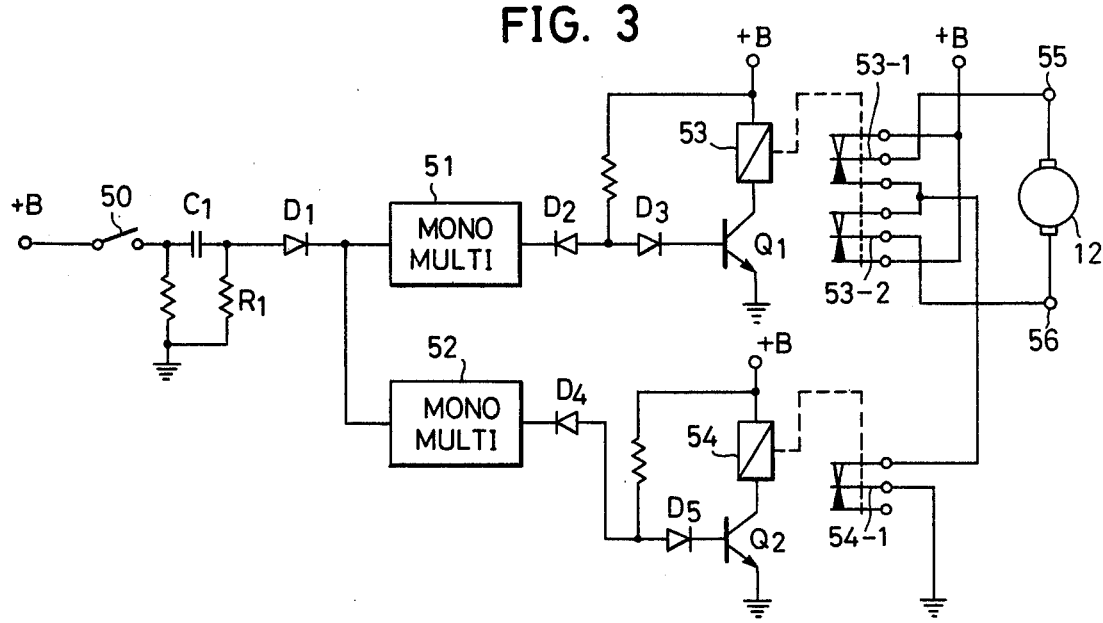

AUTOMATIC TAPE LOADING TYPE REPRODUCING APPARATUS HAVING INTERMITTENT TAPE SHIFTING CAPABILITY

BACKGROUND OF THE INVENTION

This invention relates to an automatic tape loading, cassette type, reproducing apparatus with intermittent tape shifting capability, and more particularly to a device for intermittently shifting the tape in minute quantities, with the apparatus in a still picture reproducing mode of operation.

In general, an apparatus for reproducing video signals produces a still picture by stopping the tape travel. During this operation, the rotating reproducing heads repeatedly scan and reproduce a selected track on the tape, and the still picture is thus reproduced.

In general, however, unrecorded bands, called "guard bands" are left between adjacent tracks on the tape for, the preventing effects such as beat disturbance between adjacent tracks.

At the time when the still picture is reproduced, the rotating heads scan the greater part of a guard band, depending on the stopping position of the tape. A normal picture image cannot be reproduced and, moreover, much noise will occur to produce an unsightly picture, since signals are not recorded on this guard band.

Accordingly, in order to produce a normal still picture, it is necessary to stop the tape at a position where the rotating heads will correctly scan the recorded track. However, when the tape is stopped in order to reproduce a still picture, the traveling is stopped irrespective of the relative positional relationships of the tape, rotating head, and the tracks. For this reason, it is quite possible for the tape to stop traveling at a position where the rotating heads happen to scan a guard band. In such a case, it is necessary to shift the tape stopping position so that the rotating heads will scan the track in a normal manner.

A video signal reproducing apparatus of the "open-reel" type may not provide automatic tape loading means. The tape is not contained in a cassette. The operator moves the tape slightly by manually rotating a reel, while observing the reproduced picture. When a normal still picture has been obtained, that is, when the rotating heads correctly scan the track, the tape shifting is stopped. However, in a reproducing apparatus of an automatic tape loading type, the reels are accommodated within a cassette, and the reels cannot be rotated manually. Furthermore, since the tape travel path is generally much more complicated for a cassette system than for an open-reel type, the tape friction during travel is great. If the tape is subjected to undue tension in order to forcibly shift it, the tape may be damaged. For example, an elongation may be imparted thereto.

Accordingly, there is a need for a device which will shift the tape at will through a very small distance, in order to produce a correct still picture in an automatic tape loading reproducing apparatus.

SUMMARY OF THE INVENTION

It is a general object of the present invention to provide a novel and useful automatic tape loading type of reproducing apparatus, having an intermittent tape shifting capability.

Another object of the invention is to provide an automatic tape loading type reproducing apparatus capable of intermittently shifting the tape at the time of a still reproduction. In accordance with the present invention, the tape can be moved to a position where a good still picture can be obtained without guard band noise. The tape can be fed until a different still picture is obtained.

Still another object of the invention is to provide a device for intermittently shifting the tape through small incremental distances by means of an automatic loading device.

Other objects and further features of the invention will be apparent from the following detailed description when read in conjunction with the accompanying drawings.

BRIEF DESCRIPTION OF THE DRAWINGS

In the drawings:

FIG. 3 is a circuit diagram of one embodiment of an electrical circuit for causing an intermittent tape shifting device constituting an essential part of the invention; and FIGS. 4(A), 4(B), and 4(C) are respectively signal waveform diagrams for explaining the operation of the circuit illustrated in FIG. 3.

DETAILED DESCRIPTION

Figure 1:
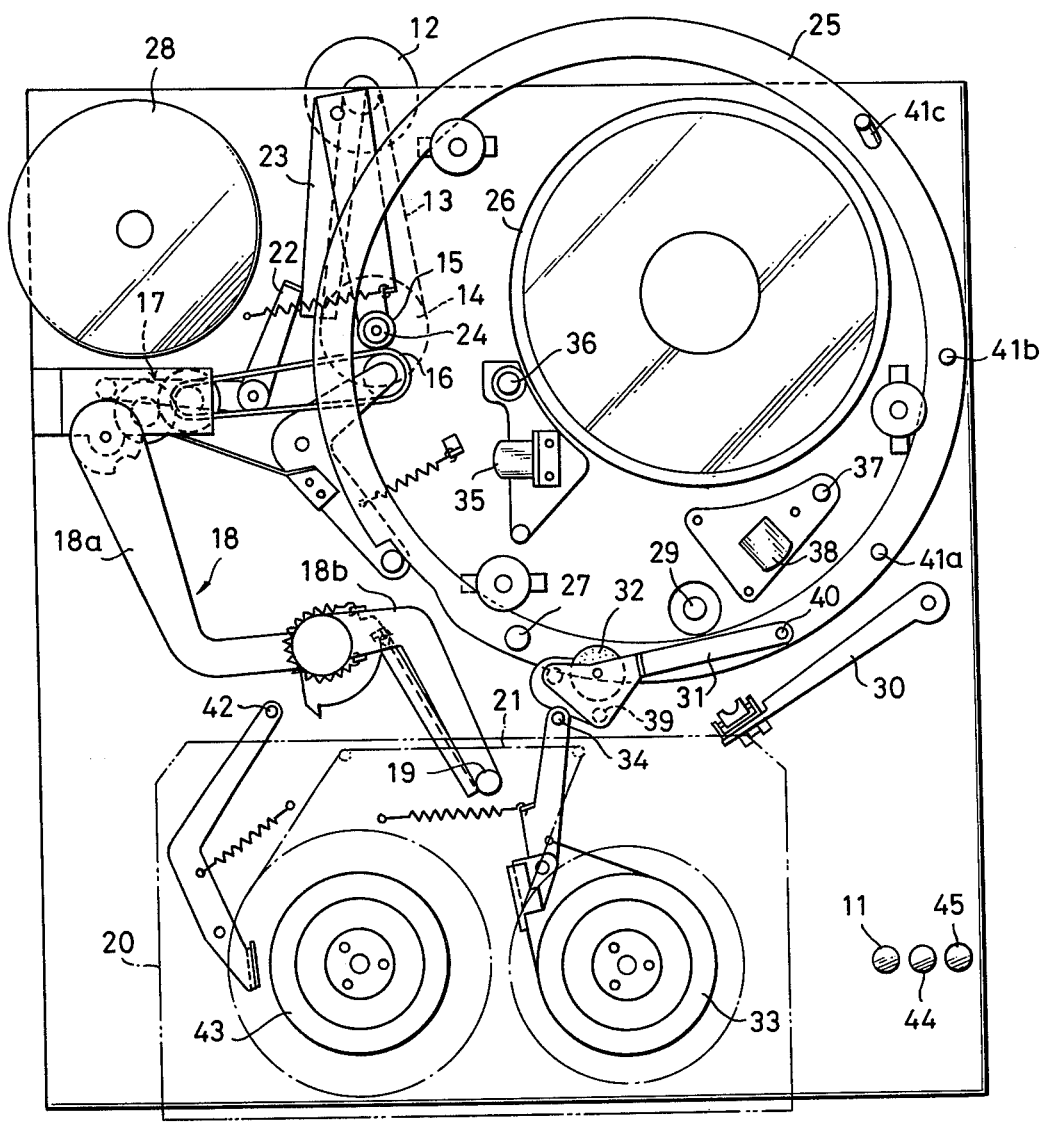
FIG. 1 is a plan view of one embodiment of the automatic tape loading type reproducing apparatus having an intermittent tape shifting capability according to the present invention, here shown prior to automatic tape loading.

Prior to start of its automatic tape loading operation, the reproducing apparatus is in the state indicated in FIG. 1. For normal reproduction, the PLAY button 11 is pushed for starting the automatic tape loading operation. A motor 12 rotates for the loading operation. The rotational energy of the motor 12 is transmitted to a rotatable arm 18, through a belt 13, a pulley 14, an idler 15, a belt 16, and a gear mechanism 17. The rotatable arm 18 comprises an arm member 18a and an arm 18b. At one end, the arm 18a is connected to the gear mechanism 17, and the arm member 18b is rotatably mounted on the other end of the arm member 18a and energized to rotate in a clockwise direction. As the arm member 18a is rotated in a counterclockwise direction from the position shown in FIG. 1, the arm member 18b moves to the position shown by a two-dot dashed line in FIG. 2. Accompanying this movement, a pole 19 mounted on a forward end of the arm member 18b intercepts the tape 21 within the cassette 20 and draws it from the cassette 20, through an opening in a front wall of the cassette. When the arm 18 further rotates and reaches the position shown by a fully line in FIG. 2, the tape 21 has been drawn from the cassette 20, as a triangular tape loop 21a.

At this instant, a lever 22 rotates in a counterclockwise direction, accompanied by the rotation of a lever 23 in a clockwise direction. A driving roller 24 is rotatably mounted coaxially with the idler 15 on the foremost end of the lever 23. The rollar 24 comes into contact with an inner periphery of a rotatable ring 25. The rotatable ring 25 rotates in a clockwise direction responsive to the driving roller 24 which is turning with rotating force transmitted from the motor 12 through the belt 13 and idler 15. The rotatable ring 25 encircles a guide drum 26 having rotating heads. The ring 25 slants against a rotating plane of the rotating heads. With the rotation ring 25, a guide pole 27 mounted thereon enters into the tape loop 21a, passing under the lower edge of the tape 21. With a further rotation of the ring 25, the guide pole 27 intercepts the tape 21, of the tape loop 21a from the inside thereof, and draws it around the guide drum 26.

When the ring 25 rotates to a predetermined angular position, a first microswitch (not shown) is closed, whereby a main motor 28 starts to rotate. The rotating heads of the guide drum 26 and a capstan 29 are rotated by the main motor 28. When the rotatable ring 25 reaches a position shown in FIG. 2, the ring 25 is stopped by a stop mechanism (not shown). A second microswitch (not shown) is opened to stop the motor 12. At the same time, a pinch roller pressing mechanism 30 presses a pinch roller 32 on a lever 31 against the capstan 29 with the tape 21 held therebetween.

Figure 2:
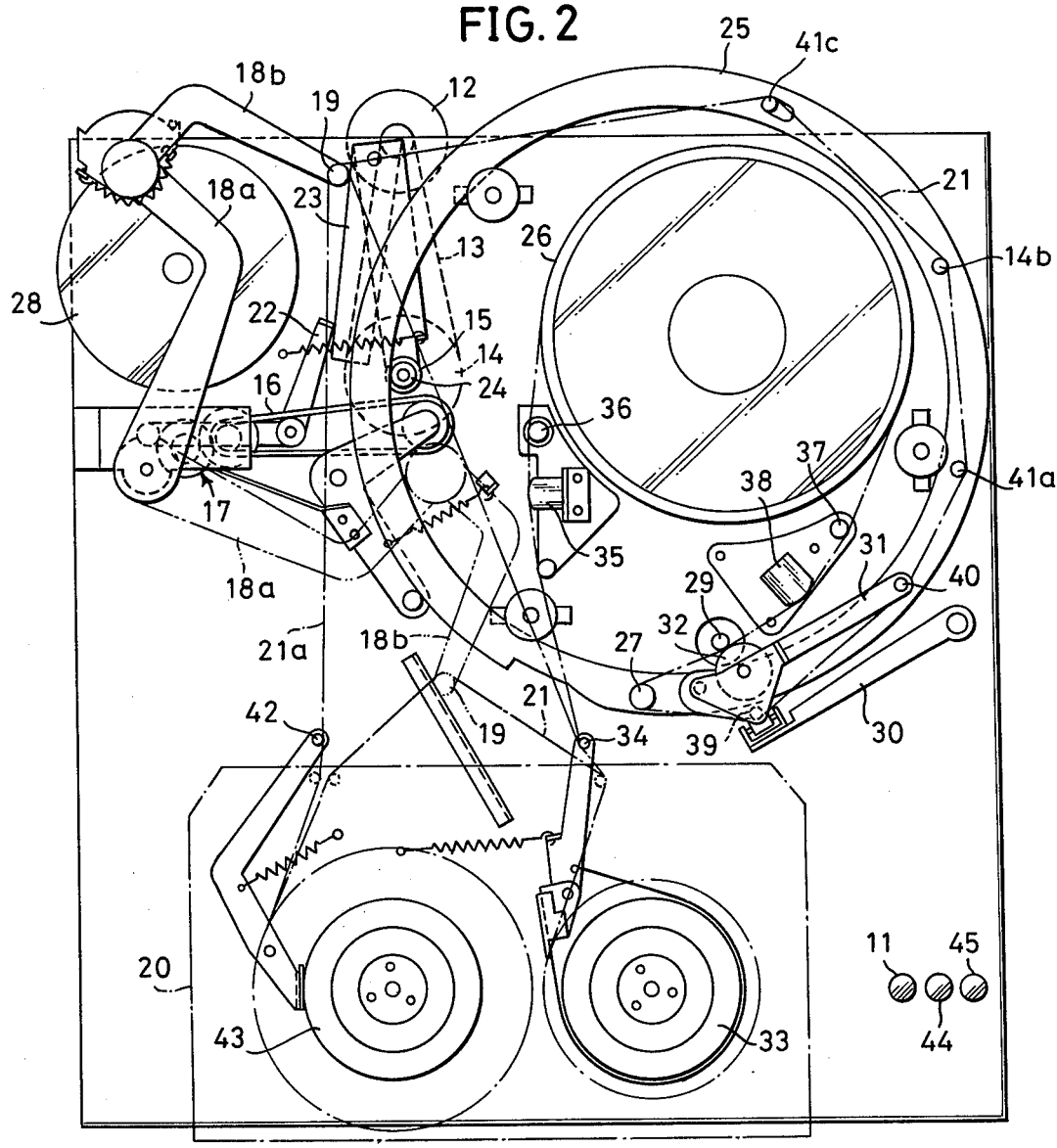
FIG. 2 is a plan view of the same automatic tape loading type reproducing apparatus after automatic tape loading.

The rotation of the ring 25 to the position shown in FIG. 2 completes the automatic tape loading. The tape 21 is loaded along a predetermined tape travelling path. Upon the completion of the loading operation, the apparatus is in the state shown in FIG. 2. The tape 21 is drawn from a supply reel 33 within the cassette 20, passes a tape tension detection pole 34, a full-width erasing head 35, and a guide pole 36. The tape 21 is then wrapped around a specific angle of the guide drum 26. The tape 21 next passes a guide pole 37 and an audio signal and control signal head 38. It is clamped between and driven by the capstan 29 and the pinch roller 32. The tape is further guided by the guide pole 27, guide poles 39, 40 and 41a through 41c mounted on the rotatable ring 25, and the guide pole 19. After the tape passes a tension detection pole 42, it is taken up on a take-up reel 43 rotating in a counterclockwise direction.

While the tape 21 travels in the above described path, the rotating heads of the guide drum 26 reproduce a recorded video signal from the tape 21. A normal reproduced picture is thus obtained on a picture screen of a television receiver.

In a normal reproducing mode, when one wants to obtain a still reproduced picture, he may push a still picture reproducing button 44 at the desired instant, which is selected while observing the reproduced picture. By pushing of the button 44, the pinch roller pressing mechanism 30 is turned in a counterclockwise direction to stop it from operating. The pinch roller lever 31 then rotates in a counterclockwise direction. The pinch roller 32 no longer makes contacts with the capstan 29. The tape 21 is no longer driven between the capstan 29 and the pinch roller 32, and it stops its travelling. The take-up reel 43 is energized toward a counterclockwise direction, however, the rotational torque of the take-up reel 43 is not strong enough to pull the tape 21 against the combination frictional forces in the tape path and the back tension of the supply reel 33. Accordingly, the tape 21 immediately stops its traveling upon being released from the driving force of the capstan. The rotating heads repeatedly scans the same track on the tape and repeatedly reproduces the video signal from that track, whereby a still picture is reproduced.

If the tape 21 is stopped at a position where the rotating heads scan almost an unrecorded guard band between adjacent tracks on the tape, guard band noises are produced on the picture screen.

In this case, one may push a button 45 to intermittently shift the tape by minute amounts. A switch 50 (FIG. 3) is closed by pushing the button 45. A positive DC voltage is applied, through the closed switch 50, to a differentiation circuit which comprises a capacitor C1 and a resistor R1. An output pulse of the differentiation circuit is formed into a positive pulse, FIG. 4(A), passing through a diode D1 of forward direction. The positive pulse thus formed is supplied to monostable multivibrators 51 and 52, as a trigger pulse.

The multivibrator 51 produces an output pulse having a pulse width (period of time) T1, as shown in FIG. 4(B). This output pulse of the multivibrator 51 is supplied, through diodes D2 and D3, to the base of an NPN transistor Q1. The transistor Q1 becomes conductive during the period of time T1, whereby a relay 53 operates, over a path traced from a positive DC power source +B and the collector-emitter of the transistor Q1, to ground. Relay contacts 53-1 and 53-2 respectively change their connections from break-contacts (shown in black triangular marks) to make-contacts (shown in blank triangular marks). The positive DC voltage is thus applied from terminal +B through the relay contact 53-1 to terminal 55 of the motor 12; during the period of time T1.

The multivibrator 52 produces an output pulse having a pulse width (period of time) T1 + T2 as shown in FIG. 4(C). Here, the period T2 is somewhat longer than the period T1, namely the period T1 + T2 is somewhat longer than twice the period T1. This output pulse of the multivibrator 52 is supplied, through diodes D4 and D5, to the base of an NPN transistor Q2. The transistor Q2 becomes conductive during the period T1 + T2, whereby a relay 54 is operated over a path from the positive DC power source +B through the collector-emitter of the transistor Q2, to ground. A relay contact 54-1 is changed from a break-contact to a make-contact. A terminal 56 of the motor 12 is then connected to the ground through the relay contacts 53-2 and 54-1.

As described above, during the period T1 while both transistors Q1 and Q2 are conductive, the terminal 55 of the motor 12 is connected to the positive DC power source terminal, while the terminal 56 is connected to the ground. Accordingly, the motor 12 rotates in a reverse direction during the period of time T1.

The rotatable ring 25 is rotated by the reverse rotation of the motor 12, during the period of time T1. Rotation is in a counterclockwise or reverse direction from the position shown in FIG. 2. The guide pole 27 moves in a counterclockwise direction to make a short total length of the tape path from the supply reel 33 to the take-up reel 43. The tape 21 in the tape path is loosened or slackened. The take-up reel 43 always has a rotational torque in a taking up or counterclockwise direction, during both normal reproducing and still picture reproducing modes. Accordingly, the tape slack due to the shortening of the tape path, is taken up on the take-up reel 43.

After the period T1, the transistor Q1 becomes non-conductive, whereby the relay 53 is released. The relay contacts 53-1 and 53-2 are then connected to the break-contacts, respectively. The transistor Q2 remains in a conductive state and, contact 54-1 remains connected to the make-contact. Accordingly, upon the switching of the relay contacts 53-1 and 53-2, the terminal 56 receives the postivie DC voltage, and the terminal 55 is connected to ground. Then, the motor 12 rotates in a normal direction. The rotatable ring 25 turns in a clockwise direction to the position shown in FIG. 2, and thereafter stops its rotation.

Accompanying the rotation in the clockwise direction of the rotatable ring 25, the guide pole 27 moves to the position shown in FIG. 2, whereby the tape path is again lengthened. The tape for the lengthened path is drawn by the guide pole 27 from the supply reel 33. At that time, the tape is not supplied from the take-up reel 43 because it has a rotational torque to take up the tape. The amount of the tape drawn from the supply reel 33 is equal to the amount of the tape taken up on the supply reel 43 by the reverse rotation of the rotatable ring 25. The period T2 is longer than the period of time T1, to accomodate the inertia of the reverse rotation of the motor 12. The motor 12 rotates positively in the normal direction, at least until the rotatable ring 25 returns to the original completed loading position shown in FIG. 2.

After the period T2, the transistor Q2 becomes nonconductive, whereby the relay 54 is released. The relay contact 54-1 is then connected to the break-contact to disconnect the motor 12 from the ground and the motor stops.

As described above a short length of the tape is taken up by the take-up reel 43 as a result of the slight reverse rotation of the rotatable ring 25. Thereafter, the tape is supplied from the supply reel 33 as a result of normal rotation of the rotatable ring 25. The position of tape 21 advances by only the short distance of the tape which is thus taken up and supplied. Accordingly, the rotating heads of the guide drum 26 scan another tape portion which is slightly different from the portion which was scanned before the pushing of the button 45.

The above described operation is performed each time that the button 45, is pushed. The tape 21 is slightly and intermittently moved or shifted. By observing the reproduced still picture, on the picture screen of the television receiver, one may repeatedly push the button 45 to intermittently shift the tape, until the guard band noise become inconspicuous in the picture screen. At that time, the rotating heads are able to normally scan a track recorded on the tape.

In the present embodiment, the pulse width or periods T1 and T1 + T2 of the monostable multivibrators 51 and 52 may be, for example, 30 m.sec and 80 - 90 m.sec. In this case, the length of the tape shifted by one intermittent tape motion is about 0.53 mm, which corresponds to one third of the distance between the centers of adjacent tracks. However, the periods T1 and T1 + T2 may have other values so that the tape is moved more than the distance between the centers of adjacent tracks or a plurality of tracks. In this case, an intermittent field or frame transfer can be carried out to obtain another still picture having different contents.

In this specification and in the appended claims, the term "automatic tape loading type reproducing apparatus" includes not only the apparatus for reproduction alone, but also automatic tape loading type recording and reproducing apparatus.

Further, this invention is not limited to these embodiments since variations and modifications may be made without departing from the scope and spirit of the invention.

What is claimed is:

1. An automatic tape loading type reproducing apparatus comprising:
   a guide drum having at least one rotating head;
   loading means for operating with a cassette having a supply reel and a take-up reel with tape wound thereon, said loading means including means for drawing the tape from the cassette and loading the drawn out tape into a path in wrapping contact with the guide drum responsive to a loading operation in a forward direction, and for storing the tape in the cassette responsive to an operation in the reverse direction;
   means comprising a driving motor selectively operating in a forward direction to drive the loading means in a forward direction and rotating in a reverse direction to drive the loading means in the reverse direction operation;
   means for imparting a torque for urging the take-up reel to tension the tape in its taking up direction;
   tape driving means for causing tape travel during normal reproduction and for terminating the tape travel during still picture reproduction;
   a switch means for momentary actuation during the still picture reproduction; and
   electrical circuit means operating in response to each of the momentary actuations of the switch to cause the driving motor to rotate briefly in a reverse direction for a specific interval of time and thereafter to rotate in a forward direction for at least said specific interval of time,
   whereby actuation of the switch during still picture reproduction causes the tape driving means to cease normal operation, to take up a short section of the tape on the take-up reel in response to the reverse direction operation of the loading means and to pay out the tape from the supply reel so that the tape is shifted intermittently in response to the forward direction operation of the loading means.

2. An automatic tape loading type reproducing apparatus as claimed in claim 1, in which said loading means comprises a lever means for drawing the tape from the cassette, and a rotatable ring means encircling the guide drum, said rotatable ring loading the drawn out tape along a predetermined path which is in contact with the guide drum; and means for operating said driving motor in normal and reverse directions responsive to signals in said electrical circuit means in order to rotate the rotatable ring in normal and reverse directions during the still picture reproduction.

3. An automatic tape loading type reproducing apparatus as claimed in claim 1, and means in said electrical circuit means for applying a voltage to turn the driving motor in a reverse direction during a predetermined period and thereafter applying a voltage to turn the driving motor in a normal direction during a period which is slightly longer than said predetermined period.

4. An automatic tape loading type reproducing apparatus as claimed in claim 1, in which said electrical circuit means comprises a differentiation circuit means for forming a pulse responsive to a closing of said switch, a first multivibrator triggered by the pulse from the differentiation circuit means to produce an output signal having a first predetermined pulse width, a second multivibrator triggered by the pulse from the differentiation circuit means to produce an output signal having a second predetermined pulse width which is longer than the first predetermined pulse width, a first relay means operated responsive to the output signal of the first multivibrator during the period of the first predetermined pulse, a second relay means operated responsive to the output signal of the second multivibrator during the second predetermined pulse, and a switching circuit means including relay contacts of the first and the second relays for switching the driving motor to rotate in a reverse direction during the period of the first predetermined pulse and to rotate in a normal direction during the period of the second predetermined pulse after the end of the first predetermined pulse period.

5. An automatic tape loading type reproducing apparatus as claimed in claim 4, in which the period of said second predetermined pulse is more than twice as long as the period of the first predetermined pulse.

6. An automatic tape loading type reproducing apparatus as claimed in claim 1, in which the tape is shifted by one intermittent operation over a distance which is shorter than the distance between adjacent tracks recorded on the tape.

* * * * *